United States Patent [19]

Doswald et al.

[11] Patent Number: 4,843,152
[45] Date of Patent: Jun. 27, 1989

[54] COPPER COMPLEXES OF DISAZO COMPOUNDS HAVING DI- OR TRI-SULFONAPHTHOL AND 6-[2,4-DI-(AMINO OR SUBSTITUTED AMINO)-1,3,5-TRIAZIA-6-YLAMINO-]-1-HYDROXY-3-SULFONAPHTHALENE COUPLING COMPONENT RADICALS

[75] Inventors: Paul Doswald, Münchenstein; Hans-Rudolf von Tobel, Riehen, both of Switzerland

[73] Assignee: Sandoz Ltd., Basel, Switzerland

[21] Appl. No.: 36,601

[22] Filed: Apr. 10, 1987

[30] Foreign Application Priority Data

Apr. 17, 1986 [DE] Fed. Rep. of Germany ....... 3612952

[51] Int. Cl.$^4$ ..................... C09B 45/24; C09B 45/28; D06P 1/10; D06P 3/60
[52] U.S. Cl. ................................. 534/701; 534/602; 534/617; 534/693; 8/686
[58] Field of Search ................. 534/701, 693, 617; 8/686

[56] References Cited

U.S. PATENT DOCUMENTS

| | | | |
|---|---|---|---|
| 2,649,354 | 8/1953 | Hemmi et al. | 8/74 |
| 4,054,559 | 10/1977 | Aoki et al. | 260/146 |
| 4,083,840 | 4/1978 | Schoefberger | 260/153 |
| 4,337,195 | 6/1982 | Vater et al. | 534/701 |
| 4,410,652 | 10/1983 | Robinson et al. | 524/195 |
| 4,594,410 | 6/1986 | Pedrazzi | 534/701 |
| 4,699,626 | 10/1987 | Von Tobel et al. | 8/549 |

FOREIGN PATENT DOCUMENTS

| | | | |
|---|---|---|---|
| 895289 | 3/1972 | Canada | 534/701 X |
| 2814802 | 10/1978 | Fed. Rep. of Germany | 534/701 |
| 877249 | 9/1961 | United Kingdom | 534/701 |
| 2144142 | 2/1985 | United Kingdom | 534/701 |

Primary Examiner—Floyd D. Higel
Attorney, Agent, or Firm—Gerald D. Sharkin; Richard E. Vila; Melvyn M. Kassenoff

[57] ABSTRACT

Complexes of the formula

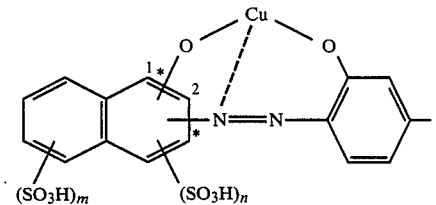

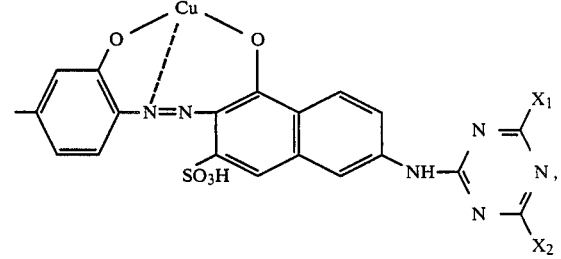

and salts thereof, wherein
each of $X_1$ and $X_2$ is independently $-NR_1R_2$,
  wherein
  $R_1$ is hydrogen, $C_{1-4}$alkyl or $C_{2-4}$alkyl monosubstituted by hydroxy or $C_{1-4}$-alkoxy, and
  $R_2$ is hydrogen; $C_{1-10}$alkyl; $C_{2-8}$hydroxyalkyl; $C_{2-8}$dihydroxyalkyl the hydroxy groups of which are attached to different carbon atoms; $C_{1-6}$alkyl monosubstituted by halo, cyano, $-OR_3$, ($C_{1-4}$alkyl)carbonyl, ($C_{1-4}$-alkoxy)carbonyl, sulfo or sulfato; phenyl; phenyl substituted by 1 or 2 substituents selected from halo, $C_{1-4}$alkyl, $C_{1-4}$alkoxy, acetamido and $-SO_2-R_4$; phenyl($C_{1-4}$alkyl); phenyl($C_{1-4}$alkyl) the phenyl group of which is substituted by 1 or 2 substituents selected from halo, $C_{1-4}$-alkyl, $C_{1-4}$alkoxy, acetamido and $-SO_2-R_4$; $C_{5-6}$cycloalkyl or $C_{5-6}$cycloalkyl substituted by 1 to 3 $C_{1-4}$alkyl groups,
  wherein
  $R_3$ is $C_{1-4}$alkyl, $C_{2-4}$-hydroxyalkyl or ($C_{1-4}$-alkyl)carbonyl, and
  $R_4$ is hydroxy, amino, $C_{1-4}$-alkyl or phenyl, or
$-NR_1R_2$ is an unsubstituted 5- or 6-membered saturated heterocyclic ring containing 1 or 2 further hetero atoms selected from nitrogen, oxygen and sulfur or a 5- or 6-membered saturated heterocyclic ring containing 1 or 2 further hetero atoms selected from nitrogen, oxygen and sulfur which is substituted by 1 to 3 $C_{1-4}$alkyl groups,
m is 1 or 2, and
n is 0 or 1,
  with the proviso that m+n is 2 or 3, with the proviso that one of the asterisked bonds is in the 1-position of the naphthalene ring and the other asterisked bond is in the 2-position, and mixtures thereof.

16 Claims, No Drawings

COPPER COMPLEXES OF DISAZO COMPOUNDS HAVING DI- OR TRI- SULFONAPHTHOL AND 6-[2,4-DI-(AMINO OR SUBSTITUTED AMINO)-1,3,5-TRIAZIA-6-YLAMINO-]-1-HYDROXY-3-SULFONAPHTHALENE COUPLING COMPONENT RADICALS

This invention relates to metallised disazo compounds containing a terminal triazinylamino group, to a process for their preparation and processes for dyeing or printing hydroxy group- or nitrogen-containing organic substrates using these compounds in conventional manner and to a special aftertreatment of the resulting dyeings and prints.

According to the invention there is provided metallised disazo compounds of formula I

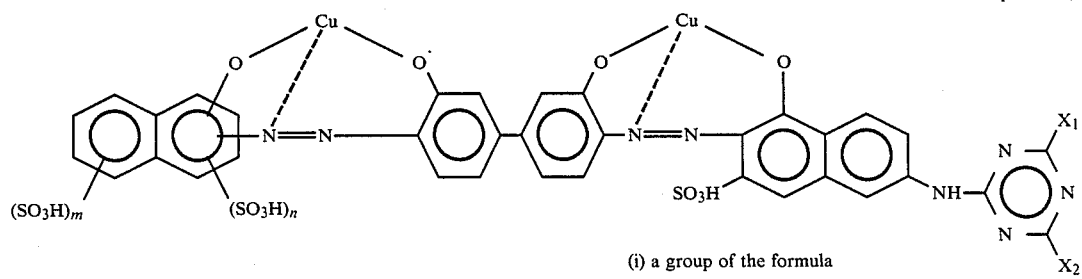

in free acid or salt form,
in which
m is 1 or 2,
n is 0 or 1, and
m+n is 2 or 3,
the azo group is bound to the 1- or 2-position of the naphthyl group, and the group —O—, in ortho-position to the azo group, is bound to the 2- or 1-position of the naphthyl group;
each of $X_1$ and $X_2$ is independently a group —$NR_1R_2$, in which
  $R_1$ is hydrogen, $C_{1-4}$alkyl or $C_{2-4}$alkyl monosubstituted by hydroxy or $C_{1-4}$alkoxy,
  $R_2$ is hydrogen; $C_{1-10}$alkyl; mono- or di-hydroxy substituted $C_{2-8}$alkyl, $C_{1-6}$alkyl monosubstituted by halogen, cyano, —$OR_3$, —$COC_{1-4}$alkyl, —$COOC_{1-4}$alkyl, —$SO_3H$ or —$OSO_3H$; phenyl or phenyl-$C_{1-4}$alkyl, the phenyl ring of which is unsubstituted or substituted by one or two groups selected from halogen, $C_{1-4}$alkyl, $C_{1-4}$alkoxy, acetamido and —$SO_2R_4$; or $C_{5-6}$cycloalkyl which is unsubstituted or substituted by up to three $C_{1-4}$ alkyl groups, or
  $R_2$ together with $R_1$ and the nitrogen atom to which $R_1$ and $R_2$ are attached forms a saturated 5- or 6-membered heterocyclic ring which may contain one or two further hetero atoms selected from N, O and S and which is unsubstituted or substituted by up to three $C_{1-4}$alkyl groups,
  $R_3$ is $C_{1-4}$alkyl, $C_{2-4}$hydroxyalkyl or —$COC_{1-4}$alkyl, and
  $R_4$ is hydroxy, amino, $C_{1-4}$alkyl or phenyl,
or a mixture of compounds of formula I, which compounds are in free acid or salt form.

In the compounds of formula I, any alkyl group present is linear or branched unless indicated otherwise. In any hydroxy-, alkoxy- or hydroxyalkoxy substituted alkyl group which is attached to a nitrogen atom, the hydroxy-, alkoxy- or hydroxyalkyoxy-group is preferably bound to a carbon atom other than to the $C_1$-atom. In any dihydroxy-substituted alkyl group the hydroxy groups are bound to different carbon atoms, which carbon atoms are preferably not adjacent to each other.

Any halogen as an alkyl substituent is preferably fluorine, chlorine or bromine, more preferably chlorine or bromine. Any halogen as a phenyl substituent is preferably chlorine or bromine, especially chlorine.

The naphthol group is preferably one of the following groups in which the starred carbon atom is bound to the azo group:

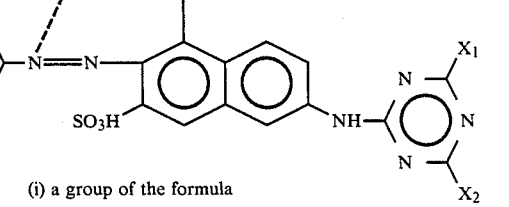

(i) a group of the formula

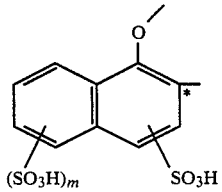

(ii) a group of the formula

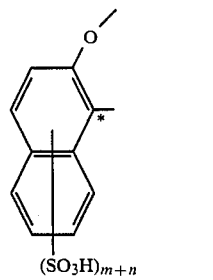

(a) when m + n is 2, the sulpho groups are in the 3,6- or 6,8- positions;
(b) when m + n is 3, the sulpho groups are in the 3,6,8-positions.

Preferred complexes of formula I are those in which the terminal naphthol group is of formula ia, i.e., of formula i wherein m is 1 and the sulpho groups are in the 3,6-, 3,8- or 4,6-positions, with those wherein they are in the 3,8-positions being more preferred.

Any mixture is preferably a mixture of two or more compounds of formula I which differ with respect to number and/or position of the sulpho groups present in the naphtholic coupling component. Preferred is a mixture of a compound of formula I containing a group of formula ia, together with a compound of formula I containing a group of formula iia, which compounds are in a ratio by weight of 85:15 to 15:85.

Any alkyl as $R_1$ is preferably methyl or ethyl, especially methyl. Any substituted alkyl as $R_1$ is preferably 2-hydroxyethyl.

Any alkyl as $R_2$ is preferably an unsubstituted $C_{1-8}$alkyl group. Any hydroxy-substituted alkyl group preferably contains 2-4 carbon atoms; more preferably it is monohydroxy-substituted. Most preferably it is 2-hydroxyethyl.

Any monosubstituted alkyl group as $R_2$ preferably contains 1-4 carbon atoms; more preferably it is a linear alkyl group. Preferably, the substituent is a group selected from chlorine, cyano, methoxy, ethoxy, —COCH$_3$, —COOC$_{1-2}$alkyl, —SO$_3$H and —OSO$_3$H; more preferably it is a group selected from methoxy, —SO$_3$H and —OSO$_3$H. Most preferably it is methoxy bound to a terminal carbon atom of a linear C$_{2-3}$alkyl group.

Any substituted phenyl or phenylalkyl group as $R_2$ preferably contains one or two groups selected from chlorine, methyl, ethyl, methoxy, ethoxy, acetamido, —SO$_3$H, —SO$_2$NH$_2$ and —SO$_2$C$_{1-2}$alkyl. More preferably, the phenyl group contains one or two groups selected from chlorine, methyl, methoxy and sulpho. Most preferably, the phenyl group is substituted by one or two groups selected from methyl and sulpho.

Any cycloalkyl as $R_2$ is preferably cyclohexyl which is unsubstituted or substituted by up to three methyl groups.

When $R_2$, together with $R_1$ and the nitrogen atom to which $R_1$ and $R_2$ are attached, forms a heterocyclic ring it is preferably a piperidine-, morpholine-, piperazine- or N-methylpiperazine-ring. Most preferably it is a morpholine ring.

$R_1$ is preferably $R_{1a}$, where $R_{1a}$ is hydrogen, methyl, ethyl or 2-hydroxyethyl. Most preferably, $R_1$ is $R_{1b}$, where $R_{1b}$ is hydrogen or 2-hydroxyethyl.

$R_3$ is preferably $R_{3a}$, where $R_{3a}$ is C$_{1-2}$alkyl, 2-hydroxyethyl or —COC$_{1-2}$alkyl. More preferably it is $R_{3b}$, where $R_{3b}$ is C$_{1-2}$alkyl; most preferably $R_3$ is methyl.

$R_4$ is preferably $R_{4a}$, where $R_{4a}$ is hydroxy, amino or C$_{1-2}$alkyl. Most preferably $R_4$ is hydroxy.

$R_2$ is preferably $R_{2a}$, where $R_{2a}$ is C$_{1-8}$alkyl, mono- or di-hydroxy-substituted C$_{2-4}$alkyl, C$_{1-4}$alkyl monosubstituted by methoxy, —SO$_3$H or —OSO$_3$H; phenyl or phenyl-C$_{1-2}$alkyl the phenyl group of which is unsubstituted or substituted by one or two groups selected from chlorine, C$_{1-2}$alkyl, C$_{1-2}$alkoxy and sulpho, or $R_{2a}$, together with $R_{1a}$ and the nitrogen atom to which $R_{1a}$ and $R_{2a}$ are attached, forms a piperidine-, morpholine-, piperazine- or N-methylpiperazine-ring. More preferably $R_2$ is $R_{2b}$, where $R_{2b}$ is C$_{1-8}$alkyl, 2-hydroxyethyl, —(CH$_2$)$_{2-3}$OCH$_3$, phenyl or phenyl substituted by one or two groups selected from methyl and sulpho, or $R_{2b}$, together with $R_{1a}$ and the nitrogen atom to which $R_{1a}$ and $R_{2b}$ are attached, forms a morpholine ring. Most preferably $R_2$ is $R_{2c}$, where $R_{2c}$ is 2-hydroxyethyl, —(CH$_2$)$_{2-3}$OCH$_3$ or phenyl substituted by one or two groups selected from methyl and sulpho.

The groups $X_1$ and $X_2$ bound to the triazine ring may be the same or different. Preferably, each of $X_1$ and $X_2$ is $X_{1a}$ and $X_{2a}$, where each of $X_{1a}$ and $X_{2a}$ is independently a group —NR$_{1a}$R$_{2a}$. More preferably, each of $X_1$ and $X_2$ is $X_{1b}$ and $X_{2b}$, where each of $X_{1b}$ and $X_{2b}$ is independently a group —NR$_{1a}$R$_{2b}$. Most preferably, each of $X_1$ and $X_2$ is $X_{1c}$ and $X_{2c}$, where each of $X_{1c}$ and $X_{2c}$ is independently a group —NR$_{1b}$R$_{2c}$.

When a compound of formula I is in salt form, the cation associated with the sulpho groups is not critical and may be any one of those non-chromphoric cations conventional in the field of anionic direct dyes provided that the corresponding salts are water-soluble. In a compound of formula I the cations of the sulpho groups can be the same or different, e.g., the compound of formula I can be in mixed salt form. Preferably, the cations of the sulpho groups are identical.

Examples of suitable cations are alkali metal cations and unsubstituted and substituted ammonium cations, e.g., lithium, sodium, potassium, ammonium, mono-, di-, tri- and tetra-methylammonium, triethylammonium and mono-, di- and tri-ethanolammonium.

The preferred cations are the alkali metal cations and ammonium, with sodium being the most preferred.

The present invention further provides a process for the preparation of the compounds of formula I comprising converting a compound of formula II,

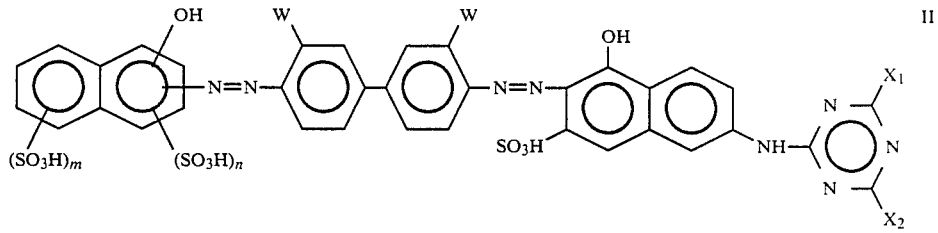

which compound is in free acid or salt form, in which W is hydroxy or methoxy, or a mixture of two or more compounds of formula II into the 1:1 copper complex by reacting with a copper(II) salt.

The 1:1 metallisation is carried out in accordance with known methods. Suitably, the corresponding hydroxy group-containing compound (W is hydroxy) is used as starting material, and coppering is preferably effected at a temperature of from 20° to 50° C. in a weakly acid reaction medium using the conventional copper(II) salts. However, with regard to the availability of the starting material, i.e., the tetrazo component in a compound of formula II in which W is methoxy, the demethylating coppering is preferred. This is preferably carried out in a weakly acid to neutral pH range and at elevated to boiling temperature in the presence of a copper(II) salt.

The compounds of formula I may be isolated in accordance with known methods, for example, by conventional salting out with alkali metal salt, filtering and drying in vacuo at elevated temperatures.

Depending on the reaction and isolation conditions a compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

The starting compounds of formula II may be prepared in accordance with known methods by diazotising on both sides the middle component containing two amino groups, and reacting first on one side and then on the other side with the corresponding coupling components. Preferably, for the second coupling reaction the amino-naphthol component already reacted with cynauric chloride is used. The necessary exchange of the chlorine atoms for amino groups may in principle be effected before or after the coupling reaction.

Diazotisation and coupling reactions may be carried out in conventional manner. The replacement of the chlorine atoms in cyanuric chloride by separate condensation steps may be effected under conditions conventionally employed for the stepwise replacement of the chlorine atoms bound to the triazine ring.

The compounds of formula I and mixtures thereof which are preferably in salt form are useful for dyeing or printing hydroxy group- or nitrogen-containing organic substrates. Preferred substrates are paper, leather and textiles containing or consisting of cellulose fibres, such as cotton. Most preferred is cotton or regenerated cellulose, particularly cotton, which also may be blended together with other suitable textile fibres.

The compounds according to the invention show high affinity for the substrate and therefore are good direct dyes. Dyeing and printing may be carried out in accordance with known methods. Dyeing of natural or regenerated cellulose such as cotton is preferably carried out according to the conventional exhaust dyeing method using temperatures from 50° to 100° C. Continuous dyeing methods are also suitable and thus processes such as cold pad-batch, pad-steam, pad-roll or pad-dry may be employed.

The compounds of formula I have high colouring strength and give high exhaust and fixation yields. They are well compatible with other dyes and may be applied per se or in combination with appropriate dyes of the same class showing similar dyeing properties. The dyeings obtained with such combination mixtures have good fastness properties.

Generally, the dyeings and prints obtained on the above mentioned substrates exhibit good wet fastness properties (such as fastness to water, washing or sweat) and good light fastness. Furthermore, they are stable to any oxidative influences, e.g., chlorinated water, hypochlorite bleach, peroxide or perborate containing wash liquors.

The wet fastness properties of the resulting dyeings or prints on hydroxy group- or nitrogen-containing textile fibres, and preferably on textile material consisting of or containing cellulose fibres, particularly cotton, may be further improved by a special aftertreatment with a polymeric polybasic amino compound (A) which is suitably carried out at a pH of from 7 to 14. Particularly, this aftertreatment gives improved wash fastness properties allowing repeated washing at 60° C.

As a polymeric polybasic amino compound (A) preferably a compound ($A_1$) is used which is the reaction product of
(a) a monofunctional or polyfunctional amine containing one or more primary and/or secondary and/or tertiary amino groups with
(b) cyanamide, dicyandiamide (DCDA), guanidine or biguanide, whereby up to 50 mole % of the cyanamide, DCDA, guanidine or biguanide may be replaced with a dicarboxylic acid or a mono- or di-ester thereof;
whereby the reaction to form the compound ($A_1$) may be effected in the absence, or also in the presence of a catalyst (for example, in the presence of a metal salt, particularly zinc chloride); said product ($A_1$) containing at least one reactive hydrogen atom bound to nitrogen.

The compounds ($A_1$) are known; they may be prepared, for example, according to the method described in British Pat. No. 657,753, U.S. Pat. No. 2,649,354 and U.S. Pat. No. 4,410,652, which method is effected in the absence of a catalyst.

The method for the preparation of compounds ($A_1$) employing a catalyst is described in published British Patent Application No. 2 163 760 A.

Most preferred as compounds ($A_1$) are the reaction products of DCDA with diethylene triamine or triethylene tetramine, prepared in the absence or in the presence of a catalyst.

Preferred compounds (A) are furthermore the following compounds ($A_2$), ($A_3$) and ($A_4$), which are reaction products of compounds ($A_1$) with
(c) an N-methylol derivative of a urea, melamine, guanamine, triazinone, urone, carbamate or acid amide/-compounds ($A_2$), or with
(d) epihalohydrin or a precursor thereof/compounds ($A_3$), or with
(e) formaldehyde or a formaldehyde precursor/compounds ($A_4$)
or reaction products of compounds ($A_1$) with (d)+(c), or with (e)+(c), where in the case that an N-methylol compound is employed the reaction ma be carried out in the presence of a catalyst for the cross-linking of the N-methylol compound.

The preparation of compounds ($A_2$) is described in U.S. Pat. No. 4,410,652; the preparation of compounds ($A_3$) and also ($A_4$) is described in British Pat. No. 2 099 007 B.

A further group of preferred compounds (A) are the compounds ($A_5$) and ($A_6$). Compounds ($A_5$) are the reaction products of compounds ($A_1$) with an organic compound containing at least two groups capable of being split off as anions on reaction with ($A_1$).

Compounds ($A_6$) are obtained by reacting epihalohydrin or a precursor thereof with a polyalkylene polyamine (C). Preferred compounds ($A_6$) are the reaction products of 1.5-2.5 moles of epichlorohydrin with 1 mole of a polyalkylene polyamine (C) corresponding to the formula,

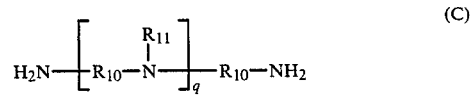

(C)

in which q is a number from 1 to 5;
each $R_{10}$ is independently $C_{2-4}$alkylene, and
each $R_{11}$ is independently phenyl, $C_{1-4}$alkyl or $C_{1-4}$alkyl monosubstituted by hydroxy, $C_{1-4}$alkoxy, halogen or phenyl.

The preparation of compounds ($A_5$) and ($A_6$) is described in published British Patent Application No. 2 152 538 A.

The aftertreatment of the dyed or printed surfaces with compound (A) is preferably carried out at a pH from 8 to 12, most preferably from 10 to 11. It may be a continuous process, for example padding, dipping, spraying or foam finishing, but is preferably a batchwise exhaust process. The aftertreatment is usually carried out at temperatures from 20°-190° C., preferably at 30°-70° C. for 3 to 60 minutes, preferably 5 to 20 minutes, preferably in the presence of 5 to 10 g/l of an electrolyte, e.g. sodium chloride or sodium sulphate.

The quantity of compound (A) used will depend upon the depth of dyeing of the substrate, but in general from 0.1 to 6%, preferably 1 to 2%, based on the dry weight of substrate may be suitable. The pH of the aftertreatment bath may be adjusted by addition of alkali metal carbonate or hydroxide, preferably sodium or potassium carbonate or hydroxide. The liquor to goods ratio of the aftertreatment bath may be from 2:1 to 50:1, and the dyed or printed substrate maa be dried before aftertreatment.

In a preferred aftertreatment process, the dyed or printed substrate is added at room temperature to a bath containing the required amount of compound (A) and 5 to 10 g/l of electrolyte, and adjusted with sodium carbonate to pH 10-11. Within 10 minutes the bath is raised to 60° C. and the substrate is treated at this temperature for 20 minutes. Finally, the aftertreated substrate is rinsed, optionally neutralised, and dried.

Dyeings and prints aftertreated according to the invention gives better wet fastness properties than untreated dyeings.

The following examples in which parts and percentages are by weight or volume unless otherwise stated, and temperatures are in degrees Centigrade, illustrate the subject matter of the invention.

EXAMPLE 1 consumed. The suspension thus obtained is cooled to room temperature and adjusted to pH 7.

(c) 12.2

Parts (0.05 moles) of 4,4'-diamino-3,3'-dimethoxy-1,1'-diphenyl in hydrochloride form are stirred with 10 parts of water and 17 parts of 30% hydrochloric acid. Within 20 minutes at 12°-15°, 7.2 parts of sodium nitrite in 25 parts of water are added dropwise whilst employing a weak external cooling. At this temperature stirring is effected for a further 40 minutes, and a clear yellow solution is formed. Any excess nitrite is decomposed with a small amount of sulphamic acid.

(d1)

The temperature of the resulting tetrazo solution is adjusted to 0° by cooling with an ice bath and by further addition of ca. 50 parts of ice. The pH is adjusted to 7 by adding 3 parts of sodium bicarbonate. Within ca. 20 minutes the solution of the first coupling component prepared according to step (a) is added dropwise, maintaining a temperature not over 3°. 4 Parts of sodium carbonate in 20 parts of water are slowly added dropwise, for adjusting and maintaining a pH of 8.7, up to the point that the one-side coupling reaction is complete. At the end of the coupling reaction which is affected during ca. 50 minutes, a small excess of coupling component should be detectable. The reaction temperature should not exceed 6°.

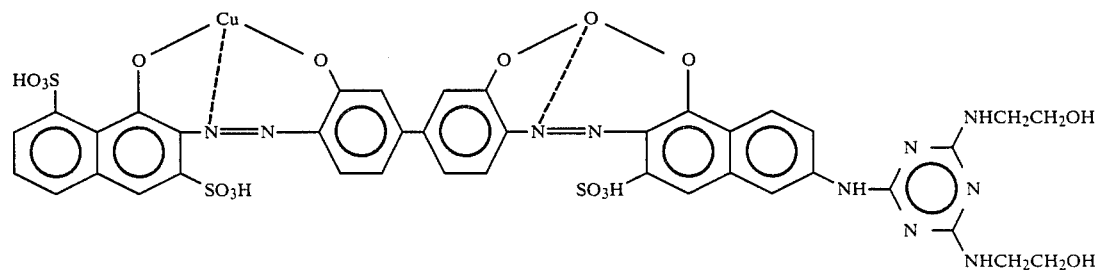

(a)
First coupling component 16.6 Parts (0.051 moles) of the monosodium salt of 1-hydroxy-8-sulphonaphthalene-3-sulphonic acid are dissolved in 130 parts of water at room temperature.

(b)
Second coupling component 7.3 Parts (0.12 moles) of monoethanolamine are stirred with 12 parts of water and 12 parts of ice. The pH is gradually adjusted to 3-4 by slowly adding 14 parts of a 30% hydrochloric acid, and subsequently 11.1 parts (0.06 moles) of cyanuric chloride are added. Stirring is effected for approximately three hours at an increasing temperature (up to a maximum of 30°) and at pH 5.5 by adding a 30% sodium hydroxide solution. The condensation reaction is completed with 17 parts of a 30% sodium hydroxide solution have been used up.

Subsequently, the pH is adjusted at 9 by adding a 30% sodium hydroxide solution. The mixture is stirred for ca. three hours at 25°-30° and at pH 9 which is maintained by adding a further amount of sodium hydroxide solution till 17 parts of a 30% sodium hydroxide solution have been used up. Into this reaction mixture 13.2 parts (0.055 moles) of 2-amino-5-hydroxynaphthalene-7-sulphonic acid are sprinkled, and the mixture is stirred for ca. three hours at 80°-90° and pH 2.2-2.5 whilst 4 parts of a 30% sodium hydroxide solution are (d2)
To this mixture the suspension of the second coupling component prepared according to step b) is pumped within ca. 10 minutes. The pH is kept at 9.5-10 by adding a 30% sodium hydroxide solution, the temperature being in the range of 6°-15°. Stirring is effected at room temperature for one to two hours, then the temperature is slowly increased up to 50°. The mixture is stirred at 50° for a further two hours. During the whole stirring procedure, the pH of the mixture is kept at 9.5-10, and a total of ca. 13 parts of a 30% sodium hydroxide solution is needed.

(e)
To the resulting action mixture 35 parts of diethanolamine, 32.5 parts CuSO$_4$.5H$_2$O in 50 parts of water and 45 parts of a 25% ammonium hydroxide solution are added to effect the final coppering at 90°-95° during 10-15 hours. By this procedure, the dyestuff is dissolved. It is isolated by adding 130 parts of sodium chloride to the solution at 90°-95°, the mixture is then cooled and filtered at 40°. The residue is washed with a solution containing 75 parts sodium chloride in 500 parts water, and the filter cake is dried in vacuo at 100°.

A dyestuff having the above given formula (in free acid form) is obtained in form of a dark-blue powder which dyes cotton a navy blue shade. The cotton dyeings show good light- and wet-fastness properties.

APPLICATION EXAMPLES

In the following examples the application of the compounds of this invention and the aftertreatment of the resulting dyeings with a polymeric compound (A) is illustrated. Polymeric polybasic compounds (A) suitable as fixing agent are as follows:

(Aa1)
Product (A) of Example 1 of U.S. Pat. No. 4,410,652.
(Aa2)
The product of Example 1 of published British Patent Application No. 2,163,760 A.
(Aa3)
The product of Example 1 of U.S. Pat. No. 4,410,652.
(Aa4)
The product of Example 8 of published British Patent Application No. 2,163,760 A.
(Aa5)
The product of Example 1 of British Pat. No. 2,099,007 B.

APPLICATION EXAMPLE I 0.5 Parts of the dyestuff of Example 1 are dissolved in 200 parts of demineralised water. The dyebath is heated to 50°–60°, then 10 parts of cotton cretonne fabric (bleached) are added. Within 30 minutes the temperature is elevated to 98°. At this temperature 1 part and after 10 minutes further 2 parts of Glauber's salt (calcined) are added, and the dyeing temperature is kept at 98° for 35 minutes. Finally, the dyebath is cooled to 80° within 15 minutes. Water that evaporates during the dyeing process is continuously replaced by 98° demineralised water of 98°. The dyeing is rinsed with running cold water, centrifuged and dried at 80°. The obtained cotton dyeing is navy blue.

APPLICATION EXAMPLE II

100 Parts of cotton woven fabric (bleached) are dyed in conventional manner, for example according to the method given in Application Example I, with 3 parts of the dyestuff of Example 1. The dyed substrate is then aftertreated, without an intermediate drying step, for 20 minutes at 60° at a liquor to goods ratio of 20:1 in an aqueous bath containing 2 parts of the polymeric compound (Aa1) and 6 g/l sodium carbonate, giving a pH of 11.0. Finally, the substrate is rinsed with cold water and dried.

The aftertreated navy blue cotton dyeing has good wash fastness properties and is resistant to washing at the boil.

When in Application Example II product (Aa1) is replaced with corresponding amounts of products (Aa2) to (Aa5), similar good results are obtained. The aftertreated cotton dyeings in view of their good wash fastness properties resist repeated washing processes.

EXAMPLES 2 TO 49

By analogy with the method described in Example 1, using appropriate starting compounds, further compounds of formula I or mixtures thereof can be prepared which are listed in the following Table. They correspond to formula (B),

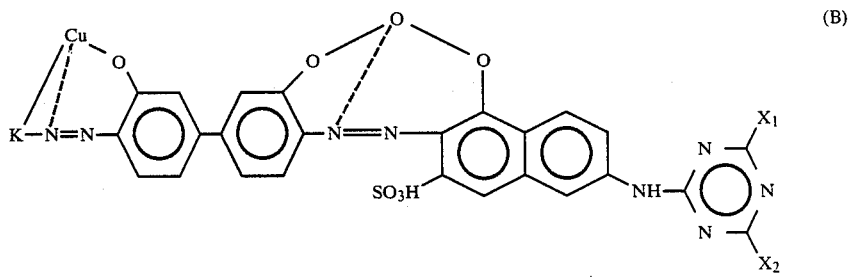

(B)

in which the symbols are as defined in the Table.

In this Table, the symbols $K_1$ to $K_7$ listed below are used for the varying coupling component K. $K_1$ to $K_7$ denote a group of the following formulae (in which the starred carbon atom is bound to the azo group):

$K_1$ is a group

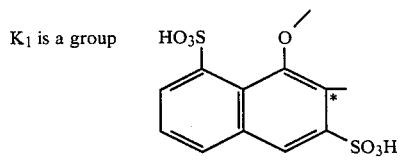

$K_2$ is a group

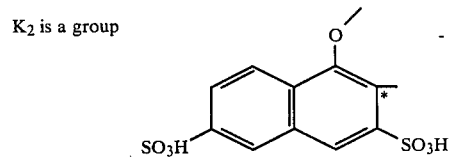

$K_3$ is a group

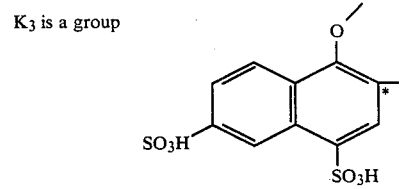

$K_4$ is a group

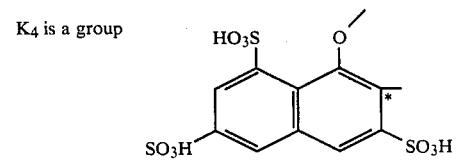

-continued

K₅ is a group 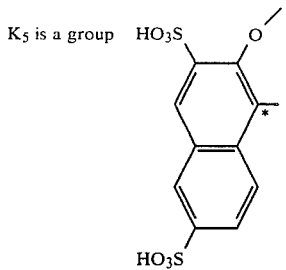

K₆ is a group 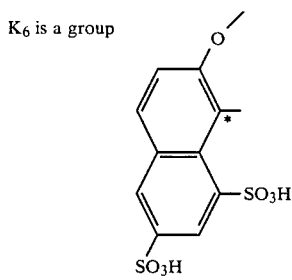

K₇ is a group 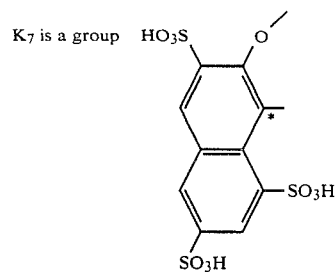

The compounds and compound mixtures listed in the Table dye cotton a navy blue shade. These cotton dyeings show good light- and wet-fastness properties.

TABLE

| | | Compounds of formula (B) | |
|---|---|---|---|
| Ex. No. | K | $X_1$ | $X_2$ |
| 1 | $K_2$ | —NHCH₂CH₂OH | Same as $X_1$ |
| 3 | $K_3$ | " | same as $X_1$ |
| 4 | $K_4$ | " | same as $X_1$ |
| 5 | $K_5$ | " | same as $X_1$ |
| 6 | $K_6$ | " | same as $X_1$ |
| 7 | $K_7$ | " | same as $X_1$ |
| 8 | 85 parts $K_1$ + 15 parts $K_5$ (by weight) | " | same as $X_1$ |
| 9 | 85 parts $K_1$ + 15 parts $K_5$ (by weight) | —N(CH₂CH₂OH)₂ | same as $X_1$ |
| 10 | $K_1$ | " | same as $X_1$ |
| 11 | $K_2$ | " | same as $X_1$ |
| 12 | $K_6$ | —N(CH₂CH₂OH)₂ | same as $X_1$ |
| 13 | $K_1$ | —NHCH₃ | same as $X_1$ |
| 14 | $K_6$ | " | same as $X_1$ |
| 15 | $K_1$ | —NH—C₆H₄—SO₃H (meta) | same as $X_1$ |
| 16 | $K_5$ | " | same as $X_1$ |
| 17 | $K_1$ | —NH—C₆H₄—SO₃H (para) | same as $X_1$ |
| 18 | $K_2$ | " | same as $X_1$ |
| 19 | $K_6$ | " | same as $X_1$ |
| 20 | $K_1$ | " | —NHCH₂CH(C₂H₅)(CH₂)₃CH₃ |
| 21 | $K_6$ | " | " |
| 22 | $K_1$ | " | —NH—C₆H₄—CH₃ (ortho) |

TABLE-continued
| | | Compounds of formula (B) | |
|---|---|---|---|
| Ex. No. | K | $X_1$ | $X_2$ |
| 23 | $K_2$ | " | " |
| 24 | 85 parts $K_1$ + 15 parts $K_5$ (by weight) | " | " |
| 25 | $K_1$ | " | 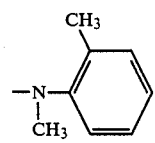 |
| 26 | $K_1$ | " | 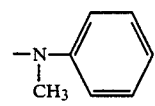 |
| 27 | $K_6$ | " | " |
| 28 | 75 parts $K_1$ + 25 parts $K_5$ (by weight) | 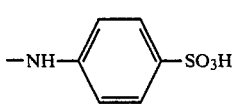 | 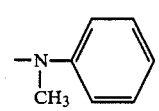 |
| 29 | $K_1$ | " | 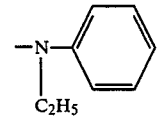 |
| 30 | $K_2$ | " | " |
| 31 | $K_1$ | " | 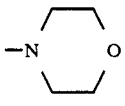 |
| 32 | $K_2$ | " | " |
| 33 | $K_4$ | " | " |
| 34 | 85 parts $K_1$ + 15 parts $K_5$ (by weight) | " | " |
| 35 | $K_6$ | " | " |
| 36 | $K_1$ | " | —NHCH$_2$CH$_2$OH |
| 37 | $K_2$ | " | " |
| 38 | $K_6$ | " | " |
| 39 | $K_1$ | " | —NH(CH$_2$)$_3$OCH$_3$ |
| 40 | $K_2$ | " | " |
| 41 | $K_1$ | 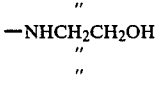 | —NHCH$_2$CH$_2$OH |
| 42 | $K_2$ | " | " |
| 43 | $K_6$ | " | " |
| 44 | $K_1$ | 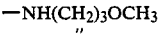 | —NHCH$_2$CH(CH$_2$)$_3$CH$_3$<br>          |<br>          C$_2$H$_5$ |
| 45 | $K_2$ | " | " |
| 46 | $K_1$ | " | —NH(CH$_2$)$_3$OCH$_3$ |

TABLE-continued

| Ex. No. | K | Compounds of formula (B) $X_1$ | $X_2$ |
|---|---|---|---|
| 47 | $K_1$ | —NHCH$_2$CH$_2$OH |  |
| 48 | $K_2$ | " | " |
| 49 | $K_5$ | " | " |

In accordance with the preparation method as described in Example 1 the dyes and dye mixtures according to Examples 1 to 49 are obtained in sodium salt form. They may, depending on the reaction and isolation conditions or by reacting the sodium salts in accordance with known methods, also be obtained in free acid form or in other salt forms, for example those salt forms containing one or more cations indicated in the description above. It is also possible to prepare mixed salt forms.

The dyes of Examples 2 to 49 may be applied in analogous manner to Application Example I and aftertreatment according to Application Example II; the thus obtained cotton dyeings have improved wash fastness properties.

What is claimed is:

1. A complex of the formula

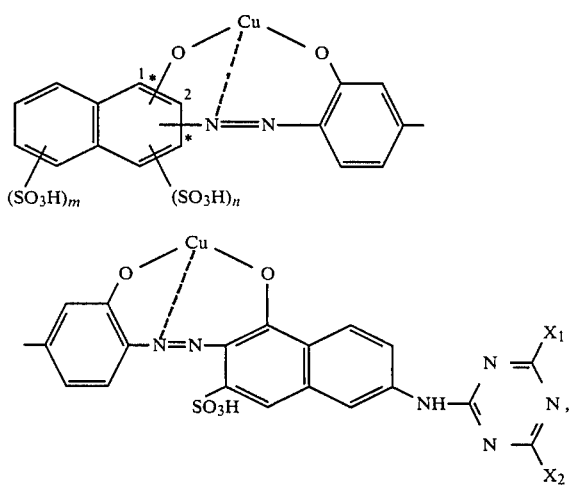

or a water-soluble salt thereof each cation of which is independently a non-chromophoric cation,
wherein each of $X_1$ and $X_2$ is independently —NR$_1$R$_2$, wherein
R$_1$ is hydrogen, C$_{1-4}$alkyl or C$_{2-4}$alkyl monosubstituted by hydroxy or C$_{1-4}$-alkoxy, and
R$_2$ is hydrogen; C$_{1-10}$alkyl; C$_{2-8}$hydroxyalkyl; C$_{2-8}$-dihydroxyalkyl the hydroxy groups of which are attached to different carbon atoms; C$_{1-6}$alkyl monosubstituted by halo, cyano, —OR$_3$, (C$_{1-4}$alkyl)-carbonyl, (C$_{1-4}$-alkoxy)carbonyl, sulfo or sulfato; phenyl; phenyl substituted by 1 or 2 substituents selected from halo, C$_{1-4}$alkyl, C$_{1-4}$alkoxy, acetamido and —SO$_2$—R$_4$; phenyl(C$_{1-4}$alkyl); phenyl(-C$_{1-4}$alkyl) the phenyl group of which is substituted by 1 or 2 substituents selected from halo, C$_{1-4}$-alkyl, C$_{1-4}$alkoxy, acetamido and —SO$_2$—R$_4$; C$_{5-6}$-cycloalkyl or C$_{5-6}$-cycloalkyl substituted by 1 to 3 C$_{1-4}$alkyl groups,
wherein
R$_3$ is C$_{1-4}$alkyl, C$_{2-4}$-hydroxyalkyl or (C$_{1-4}$-alkyl)-carbonyl, and
R$_4$ is hydroxy, amino, C$_{1-4}$-alkyl or phenyl, or
—NR$_1$R$_2$ is an unsubstituted 5- or 6-membered saturated heterocyclic ring containing 1 or 2 further hetero atoms selected from nitrogen, oxygen and sulfur or a 5- or 6-membered saturated heterocyclic ring containing 1 or 2 further hetero atoms selected from nitrogen, oxygen and sulfur which is substituted by 1 to 3 C$_{1-4}$alkyl groups,
m is 1 or 2, and
n is 0 or 1,
with the proviso that m+n is 2 or 3,
with the proviso that one of the asterisked bonds is in the 1-position of the naphthalene ring and the other asterisked bond is in the 2-position of the naphthalene ring, or a mixture of such complexes or water-soluble salts.

2. A complex according to claim 1, or a water-soluble salt thereof each cation of which is independently a non-chromophoric cation.

3. A complex according to claim 2, or a water-soluble salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium.

4. A complex according to claim 2, or a water-soluble salt thereof each cation of which is independently a non-chromophoric cation, wherein

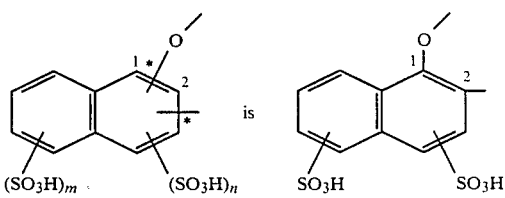

wherein the sulfo groups are in the 3,6-, 3,8- or 4,6-positions.

5. A complex according to claim 4, or a water-soluble salt thereof each cation of which is independently a non-chromophoric cation, wherein the sulfo groups are in the 3,8-positions.

6. A complex according to claim 2, or a water-soluble salt thereof each cation of which is independently a non-chromophoric cation,
wherein each of $X_1$ and $X_2$ is independently —NR$_{1a}$R$_{2a}$,
wherein $R_{1a}$ is hydrogen, methyl, ethyl or 2-hydroxyethyl, and $R_{2a}$ is $C_{1-8}$alkyl; $C_{2-4}$hydroxyalkyl; $C_{2-4}$dihydroxyalkyl the hydroxy groups of which are attached to different carbon atoms; $C_{1-4}$-alkyl monosubstituted by methoxy, sulfo or sulfato; phenyl; phenyl substituted by 1 or 2 substituents selected from chloro, $C_{1-2}$alkyl, $C_{1-2}$alkoxy and sulfo; phenyl($C_{1-2}$alkyl) or phenyl($C_{1-2}$alkyl) the phenyl group of which is substituted by 1 or 2 substituents selected from chloro, $C_{1-2}$alkyl, $C_{1-2}$-alkoxy and sulfo, or —$NR_{1a}R_{2a}$ is piperidino, morpholino, piperazino or N'-methylpiperazino.

7. A complex according to claim 6, or a water-soluble salt thereof each cation of which is independently a non-chromophoric cation, wherein

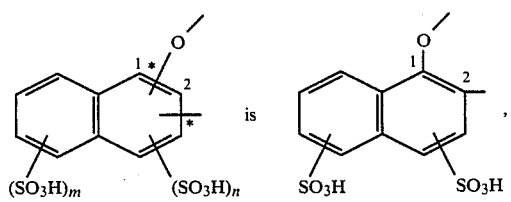

wherein the sulfo groups are in the 3,6-, 3,8- or 4,6-positions when m is 1 and in the 3,6,8-positions when m is 2, or

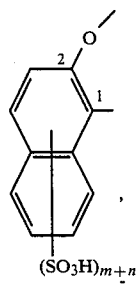

wherein the sulfo groups are in the 3,6- or 6,8-positions when m+n is 2 and in the 3,6,8-positions when m+n is 3.

8. A complex according to claim 6, or a water-soluble salt thereof each cation of which is independently a non-chromophoric cation, wherein each of $X_1$ and $X_2$ is independently —$NR_{1a}R_{2b}$, wherein $R_{1a}$ is hydrogen, methyl, ethyl or 2-hydroxyethyl, and $R_{2b}$ is $C_{1-8}$alkyl, 2-hydroxyethyl, —$(CH_2)_a$—O—$CH_3$, phenyl or phenyl substituted by 1 or 2 substituents selected from methyl and sulfo, wherein a is 2 or 3, or —$NR_{1a}R_{2b}$ is morpholino.

9. A complex according to claim 8, or a water-soluble salt thereof each cation of which is independently a non-chromophoric cation, wherein

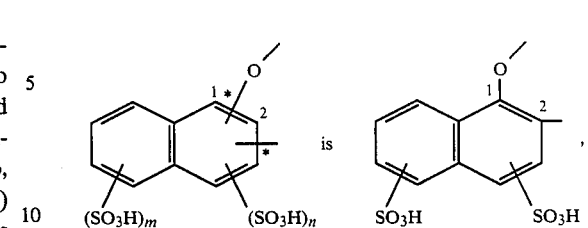

wherein the sulfo groups are in the 3,6-, 3,8- or 4,6-positions when m is 1 and in the 3,6,8-positions when m is 2, or

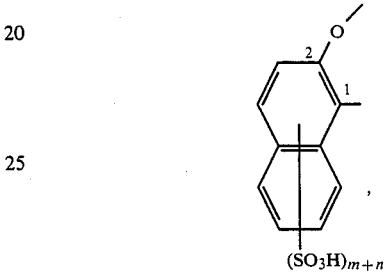

wherein the sulfo groups are in the 3,6- or 6,8-positions when m+n is 2 and in the 3,6,8-positions when m+n is 3.

10. A complex according to claim 8, or a water-soluble salt thereof each cation of which is independently a non-chromophoric cation, wherein each of $X_1$ and $X_2$ is independently —$NR_{1b}R_{2c}$, wherein $R_{1b}$ is hydrogen or 2-hydroxyethyl, and $R_{2c}$ is 2-hydroxyethyl, —$(CH_2)_a$—O—$CH_3$ or phenyl substituted by 1 or 2 substituents selected from methyl and sulfo, wherein a is 2 or 3.

11. A complex according to claim 10, or a water-soluble salt thereof each cation of which is independently a non-chromophoric cation, wherein

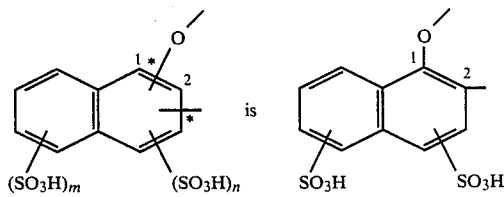

wherein the sulfo groups are in the 3,6-, 3,8- or 4,6-positions when m is 1 and in the 3,6,8-positions when m is 2, or

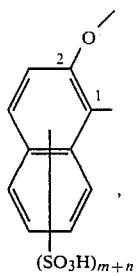

wherein the sulfo groups are in the 3,6- or 6,8-positions when m+n is 2 and in the 3,6,8-positions when m+n is 3.

12. The complex according to claim 11 having the formula

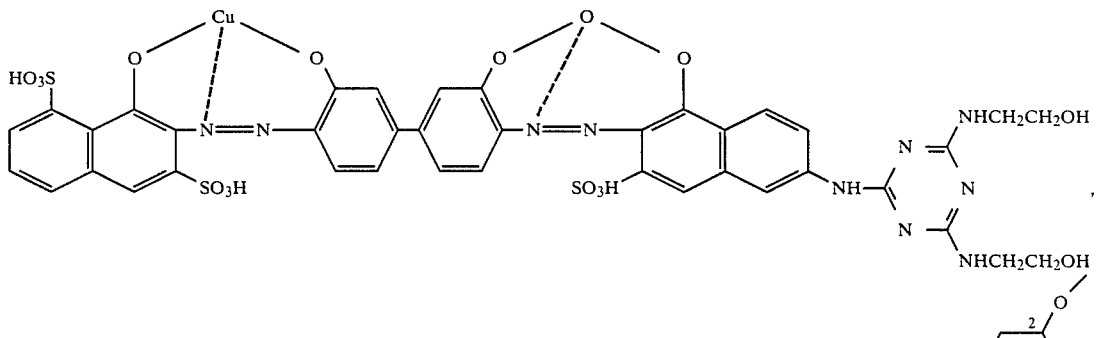

or a water-soluble salt thereof each cation of which is non-chromophoric.

13. The complex according to claim 12 in sodium salt form.

14. A mixture according to claim 1.

15. A mixture according to claim 14 of complexes or water-soluble salts each cation of which is independently lithium, sodium, potassium, ammonium, methylammonium, dimethylammonium, trimethylammonium, tetramethylammonium, triethylammonium, ethanolammonium, diethanolammonium or triethanolammonium.

16. A mixture according to claim 14 consisting of (i) a complex wherein

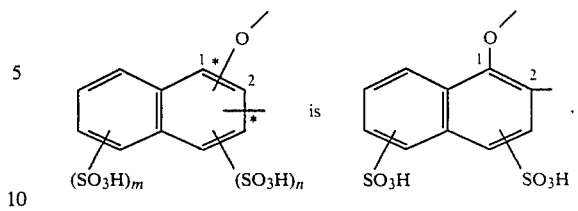

wherein the sulfo groups are in the 3,6-, 3,8- or 4,6 positions,
or a water-soluble salt thereof each cation of which is independently a non-chromophoric cation, and
(ii) a complex wherein

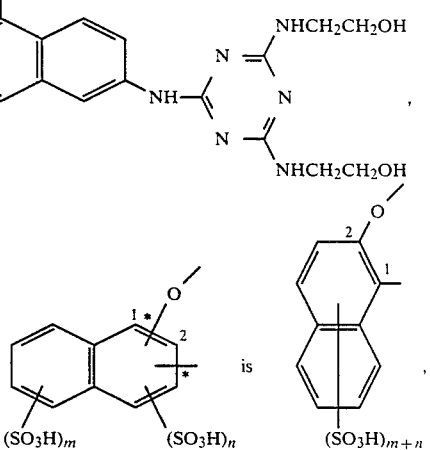

wherein m+n is 2 and the sulfo groups are in the 3,6- or 6,8-positions, or a water-soluble salt thereof each cation of which is independently a non-chromophoric cation,
wherein the ratio of (i) to (ii) by weight is 85:15 to 15:85.

* * * * *